(12) United States Patent
Kreutzer et al.

(10) Patent No.: US 9,789,751 B2
(45) Date of Patent: Oct. 17, 2017

(54) THERMAL BARRIERS FOR COMPARTMENTS

(71) Applicant: Alliance for Sustainable Energy, LLC, Golden, CO (US)

(72) Inventors: Cory J. Kreutzer, Arvada, CO (US); Jason A. Lustbader, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 15/291,604

(22) Filed: Oct. 12, 2016

(65) Prior Publication Data

US 2017/0100990 A1 Apr. 13, 2017

Related U.S. Application Data

(60) Provisional application No. 62/240,804, filed on Oct. 13, 2015.

(51) Int. Cl.
 *B62D 33/00* (2006.01)
 *B60J 1/20* (2006.01)
 *B60R 13/08* (2006.01)
 *B62D 33/06* (2006.01)

(52) U.S. Cl.
 CPC ......... *B60J 1/2011* (2013.01); *B60R 13/0823* (2013.01); *B62D 33/0612* (2013.01)

(58) Field of Classification Search
 CPC . B60J 1/2011; B60R 13/0823; B62D 33/0612
 See application file for complete search history.

(56) References Cited

U.S. PATENT DOCUMENTS

| 289,573 | A |  | 12/1883 | Scott |  |
|---|---|---|---|---|---|
| 1,168,343 | A |  | 1/1916 | Smith |  |
| 4,560,245 | A |  | 12/1985 | Sarver |  |
| 4,775,180 | A |  | 10/1988 | Phillips |  |
| 4,893,908 | A | * | 1/1990 | Wolf | G02F 1/1533 359/275 |
| 4,938,518 | A |  | 7/1990 | Willemsen |  |
| 5,010,943 | A |  | 4/1991 | Boyer |  |
| 5,042,551 | A | * | 8/1991 | Ein | B60J 1/2011 160/370.21 |

(Continued)

FOREIGN PATENT DOCUMENTS

| GB | 2 458 183 A | 9/2009 |
|---|---|---|
| WO | WO 01/12468 A1 | 2/2001 |

OTHER PUBLICATIONS

Gaines et al., "Estimation of Fuel Use by Idling Commercial Trucks", 85th Annual Meeting of the Transportation Research Board, Washington, D.C., Jan. 22-26, 2006, Paper No. 06-2567, pp. 1-12.

(Continued)

*Primary Examiner* — Lori L Lyjak
(74) *Attorney, Agent, or Firm* — Michael A. McIntyre

(57) ABSTRACT

An aspect of the present disclosure is a thermal barrier that includes a core layer having a first surface, a second surface, and a first edge, and a first outer layer that includes a third surface and a second edge, where the third surface substantially contacts the first surface, the core layer is configured to minimize conductive heat transfer through the barrier, and the first outer layer is configured to maximize reflection of light away from the barrier.

20 Claims, 11 Drawing Sheets

(56) References Cited

U.S. PATENT DOCUMENTS

| | | | |
|---|---|---|---|
| 5,792,539 A * | 8/1998 | Hunter | B32B 3/28 |
| | | | 428/178 |
| 6,037,033 A * | 3/2000 | Hunter | B32B 3/28 |
| | | | 428/178 |
| 6,105,653 A | 8/2000 | Armstrong | |
| 6,114,003 A | 9/2000 | Gottfried | |
| 6,135,193 A * | 10/2000 | Lloyd | B60J 1/2091 |
| | | | 160/370.21 |
| 6,231,944 B1 | 5/2001 | Holt | |
| 6,446,751 B1 | 9/2002 | Ahuja et al. | |
| 6,802,551 B2 | 10/2004 | Nelson | |
| 8,251,433 B2 | 8/2012 | Boer | |
| 2007/0209317 A1 * | 9/2007 | Jensen | B05D 7/14 |
| | | | 52/834 |
| 2009/0303671 A1 * | 12/2009 | Aslin | B32B 15/12 |
| | | | 361/679.01 |
| 2011/0139542 A1 | 6/2011 | Borroni | |
| 2014/0182831 A1 * | 7/2014 | Hauenstein | E04B 31/74 |
| | | | 165/185 |
| 2017/0096902 A1 * | 4/2017 | Novovic | F01D 25/005 |

OTHER PUBLICATIONS

Lustbader et al., "Long-Haul Truck Sleeper Heating Load Reduction Package for Rest Period Idling", SAE International, Presented at the SAE 2016 World Congress & Exhibition, Apr. 12-14, 2016, pp. 453-458.
Stodolsky et al., "Analysis of Technology Options to Reduce the Fuel Consumption of Idling Trucks", Argonne National Laboratory, ANL/ESD-43, Jun. 2000, pp. 1-32.

* cited by examiner

THERMAL BARRIERS FOR COMPARTMENTS

CROSS-REFERENCE TO RELATED APPLICATIONS

This application claims the benefits of U.S. Provisional Application No. 62/240,804 filed Oct. 13, 2015, the contents of which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Long-haul trucks, trucks that travel more than 500 miles per day, frequently run their engines during driver rest periods, often due to the need for cab climate conditioning. This practice is commonly referred to as idling the engine. In the United States alone, long-haul trucks consume approximately 667 million gallons of fuel annually by idling during rest periods. The inclusion of workday idling increases the usage rate to more than two billion gallons of fuel annually. As awareness of the amount of fuel consumed during periods of idling has increased, federal regulations and incentives have been created. For example, idle reduction technology credits were introduced to the Heavy-Duty Greenhouse Gas Emissions Standards in 2014. Increased awareness has also spurred implementation of stringent state and city anti-idling regulations.

The reduction of the thermal loads associated with idling may provide significant opportunities to reduce fuel usage and the resultant emission of pollutants, including greenhouse gases. Enhancing the thermal performance of cabs (including cabs with sleeper compartments) may enable smaller, lighter, and more cost-effective solutions that minimize the negative effects of engine idling. In addition, fuel savings from new technologies may provide sufficiently short payback periods that fleet owners may be economically motivated to incorporate these new technologies into their vehicles. Therefore, the potentially significant financial savings offered by newly developed technologies, technologies that minimize engine idling and the effects of engine idling, may enable the quick acceptance and implementation of these technologies into the transportation industry. Thus, there remains a need for improved systems, devices, and methods that provide energy improvement solutions for long-haul trucks, as well as other vehicles and/or compartments.

SUMMARY

An aspect of the present disclosure is a barrier that includes a core layer having a first surface, a second surface, and a first edge, and a first outer layer that includes a third surface and a second edge, where the third surface substantially contacts the first surface, the core layer is configured to minimize conductive heat transfer through the barrier, and the first outer layer is configured to maximize reflection of light away from the barrier. In some embodiments of the present disclosure, a barrier may further include a second outer layer having a fourth surface and a third edge, where the fourth surface may substantially contact the second surface and the second outer layer may be configured to maximize or minimize the reflection of light away from the barrier. In some embodiments of the present disclosure, at least one of the first outer layer or the second outer layer may include a metalized material. In some embodiments of the present disclosure, the metalized material may include TEMPTROL®.

In some embodiments of the present disclosure, at least one of the first outer layer or the second outer layer may have a reflectivity of up to 95% for light with a wavelength between about 10 nm and about 10,000 nm. In some embodiments of the present disclosure, at least one of the first outer layer or the second outer layer may be secured to the core layer by at least one of VELCRO®, an adhesive, a melted strip, a stitch, a staple, a button, and/or a zipper. In some embodiments of the present disclosure, the core layer may have a thickness between about 1 mm and about 50 mm. In some embodiments of the present disclosure, the core layer may include at least one of fiberglass, cellulose, polyurethane, and/or polystyrene. In some embodiments of the present disclosure, the core layer may include THINSULATE®. In some embodiments of the present disclosure, the core layer may have an R-value between about 2 hr ft$^{2\circ}$ F./Btu per inch and about 50 hr ft$^{2\circ}$ F./Btu per inch.

In some embodiments of the present disclosure, a barrier may further include at least one flap attached to at least one of the core layer, the first outer layer, and/or the second outer layer, where the at least one flap may be configured to be in contact with an interior surface such that the flap minimizes air flow between the barrier and the interior surface. In some embodiments of the present disclosure, the at least one flap may be attached to at least one of the first edge, the second edge, and/or the third edge, and the at least one flap may be attached by at least one of an adhesive, a staple, a rivet, a zipper, and/or a stitch. In some embodiments of the present disclosure, at least one flap may include at least one of a solid polymeric material, a metalized material, and/or an insulating material. In some embodiments of the present disclosure, at least one of the first edge, the second edge, and/or the third edge may extend beyond a boundary defined by a neighboring edge to form at least one flap, and the at least one flap may be configured to be in contact with an internal surface such that the flap minimizes air flow between the barrier and the internal surface. In some embodiments of the present disclosure, the boundary may be a seam used to stitch at least one of the first outside layer, the second outside layer, and/or the core layer together. In some embodiments of the present disclosure, the barrier may be divided into a first part and a second part by a connector configured to be reversibly fastened and unfastened. In some embodiments of the present disclosure, the connector may include at least one of VELCRO®, a button, magnets, and/or a zipper. In some embodiments of the present disclosure, first outer layer and the second outer layer may be configured from a single, uncut piece of a material.

An aspect of the present disclosure is a system that includes an interior surface and a barrier that includes a core layer having a first surface, a second surface, and a first edge. The barrier also includes a first outer layer having a third surface and a second edge, and at least one flap attached to at least one of the first edge or the second edge. Further, the third surface is secured to the first surface, the core layer is configured to minimize conductive heat transfer through the barrier, the first outer layer is configured to maximize reflection of light away from the barrier, the at least one flap is configured to be in contact with the interior surface such that the flap minimizes convective air flow between the barrier and interior surface, and the core, the first outer layer, and the at least one flap are substantially flexible.

In some embodiments of the present disclosure, the system may further include a second outer layer having a fourth surface, where the fourth surface may be secured to the second surface, and the second outer layer may be configured to maximize the reflection of light away from the barrier.

An aspect of the present disclosure is a method that includes dividing a first space from a second space with a thermal barrier, where the dividing includes reducing or eliminating conductive heat transfer through the thermal barrier, maximizing or minimizing the reflection of electromagnetic energy from at least one external surface of the thermal barrier, and reducing or eliminating convective heat transfer around at least one surface or edge of the thermal barrier between the first space and the second space such that the thermal barrier minimizes the transfer of heat between the first space and the second space. In some embodiments of the present disclosure, the dividing may be performed in a cab of a vehicle.

BRIEF DESCRIPTION OF THE DRAWINGS

Some embodiments of the present disclosure are illustrated in referenced figures of the drawings. It is intended that the embodiments and figures disclosed herein are to be considered illustrative rather than limiting.

REFERENCE NUMBERS

Figure 1:
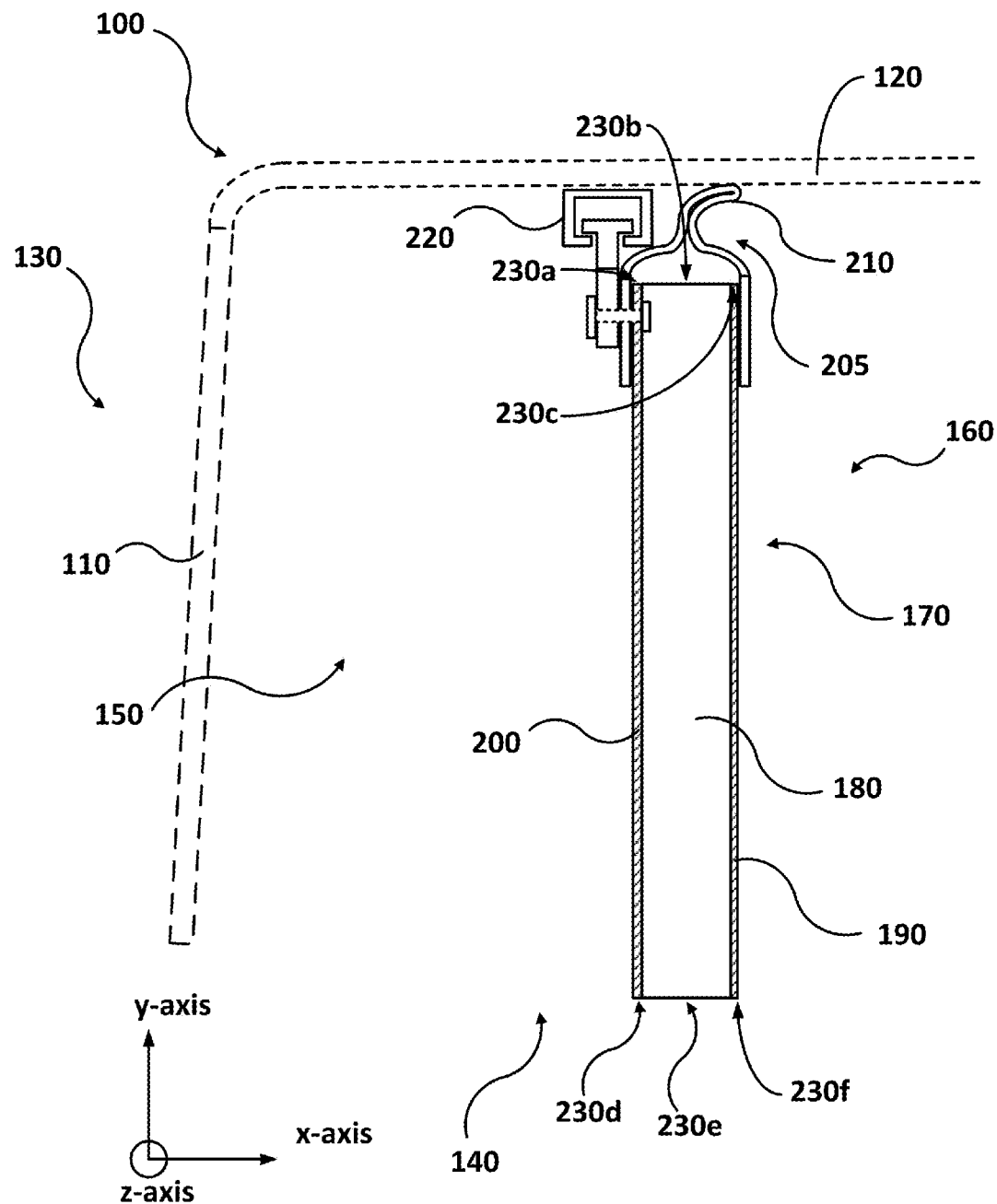
FIG. 1 illustrates a thermal barrier positioned within a compartment (for example the cab of a long-haul truck), according to some embodiments of the present disclosure.

100 . . . compartment
110 . . . window
120 . . . wall
130 . . . exterior
140 . . . interior
150 . . . first interior space
160 . . . second interior space
170 . . . thermal barrier
180 . . . core layer
190 . . . first outer layer
200 . . . second outer layer
205 . . . gap
210 . . . flap
220 . . . mounting track
225 . . . mounting hardware
230a-f . . . edge
300 . . . slide
310 . . . connector
320a and 320b . . . tab
400 . . . thermal barrier system
410a-c . . . connecting boundary
900 . . . opening
910 . . . third interior space
920 . . . connector
1100 . . . method
1110 . . . reducing and/or eliminating conductive heat transfer
1120 . . . maximizing reflection
1130 . . . reducing and/or eliminating convective heat transfer

DETAILED DESCRIPTION

The present disclosure relates to thermal barriers, which among other advantages, minimize heat transfer from one compartment, volume, and/or space to another, as well as from a compartment's interior volume to the external environment. Examples include privacy shades for long-haul trucks and separator curtains for segregating a driver portion of a truck's cab from a sleeping compartment (often referred to as a "sleeper"). However, some of the embodiments of the present disclosure may be suitable for other vehicles such as planes, trains, boats, buses, etc. Some embodiments of the present disclosure may be used as privacy shades to cover windshields, side windows, sunroofs, and/or the sleeper windows of a truck's cab. In other examples, a cab-to-sleeper separator curtain may be used to provide a physical separation of the sleeper area from the front cab portions of a truck. Such a curtain is desirable during use of a sleeper compartment during rest-periods, for example in "team driving" situations where one occupant may be resting while a second occupant is driving. Engine idling or operation of an auxiliary heating, ventilation, and air conditioning system often occurs during such rest-periods for climate control in the truck's cab. Some of the examples provided herein, provide compartment barriers that provide cost-effective privacy solutions, in addition to excellent thermal performances, such as reduced heat/energy transfer between different spaces of a truck's cab and/or reduced heat/energy transfer from the cab to the surrounding outside environment.

In some examples, thermal barriers and/or shades may incorporate designs, which reduce the radiative, conductive, and/or convective heat transfer between the external environment partially or completely surrounding a compartment and an interior space within a compartment. In addition, some thermal barriers and/or shades may reduce the radiative, conductive, and/or convective heat transfer between two or more interior spaces within the same compartment (e.g. between the front driving area and a sleeper compartment). In some examples, the outside surfaces of a thermal barrier may be constructed to have a highly thermally reflective outer layer; e.g. a metallized fabric. For applications requiring that the compartment maintain a cooler interior cab environment relative to the external environment ("cooling applications"), a reflective outer layer may reflect a significant fraction of the solar energy and/or other heat from the outside environment and/or from an adjacent compartment. For example, radiant heat transfer from the outside environment through a window into the interior of a compartment may be dramatically reduced by implementing a reflective outer layer into a thermal barrier. Alternatively, radiant heat transfer from the outside environment through a window into an adjacent compartment may be absorbed and reemitted as infrared radiation into the compartment of interest, and this radiation may be reduced by implementing a reflective outer layer into a thermal barrier. In both examples, the reduction in energy input into the conditioned compartment(s), would result in lower energy usage by the cab's air-conditioning system. For applications requiring a warmer interior environment relative to the external environment ("heating applications"), a thermally reflective outer layer (but facing into the compartment's interior) may assist with containing heat inside the climate-controlled compartment, thus helping to maintain a target temperature within the space and reducing the energy usage of the climate control system.

A thermal barrier such as a curtain or shade may have an insulating core constructed, for example, from a commercially available hydrocarbon polymer with a low thermal conductivity and low volumetric heat capacity. A number of commercially available insulation materials may be used as a core for a thermal barrier, however, hydrocarbon polymer based blanket insulations provide a low weight, low volumetric heat capacity, high compressibility, and high durability suitable for high "wear-and-tear" applications, and may be especially well suited for thermal barriers used in transportation vehicle environments. Such a core may in some embodiments be in the form of a layer and/or any other suitable form or shape.

A thermal barrier such as a curtain or shade may be constructed to have a highly reflective interior layer; e.g. a metallized fabric. For applications requiring a warmer interior environment relative to the external environment ("heating applications"), a thermally reflective inner layer reduces thermal radiation from warm surfaces within a climate-controlled space, thus helping to maintain a target temperature within the space and reducing the energy usage of the climate control system.

In some examples, a thermal barrier (e.g. curtain or shade or other barrier) may include material positioned around its perimeter, or part of its perimeter, to reduce the exchange of air between opposing sides of the thermal barrier. For example, material may be positioned around a portion of a thermal barrier's perimeter or connecting seams (in the case of the sleeper curtain) to help minimize or eliminate convective heat transfer from one side of the barrier to the other. In both heating and cooling applications, the perimeter material of the thermal barrier, referred to herein as a "flap", may limit buoyantly driven or forced air exchange that could otherwise occur through air gaps at the top, bottom, and/or sides of the thermal barrier. In cooling applications, an air space between a thermal barrier and window often exists and the temperature of this air can increase significantly due to energy input from the sun and/or surrounding environment. When the air on the opposing interior side of the thermal barrier is at a much lower temperature, air exchange may readily occur due to differences in air buoyancy and, as a result, heat may be easily transferred around the perimeter of the thermal barrier. Similarly, during daytime sleeping conditions, the front driving area of the vehicle often gets very warm when under solar load, and air exchange between the front cab section and the sleeper compartment may readily occur due to temperature differences between the two compartments and, as a result, heat may be easily transferred around the perimeter of the thermal barrier. Such air exchange examples may be significantly reduced by physically blocking the air pathway using flaps as described herein.

For heating applications, the air space between a window and a thermal barrier and/or shade may be much colder than the air on the opposing interior side of the shade and a physical blockage of the air pathways, as provided by examples of flaps as described herein, may inhibit the heat transfer between the separated air spaces; e.g. heat loss from the interior space to the outside environment. The same phenomenon may also occur between the front driving area and the sleeper area of a compartment and the addition of flaps to a perimeter of a thermal barrier (e.g. curtain) may significantly reduce convective heat transfer between the two areas. To facilitate effective reduction in air exchange between a driver volume and the sleeper volume, one or more flaps may be provided to the perimeter of a thermal barrier.

In addition, some embodiments of the present disclosure may also include mounting hardware such as sliders and fasteners to facilitate easier use of the thermal barriers; e.g. opening and closing. Also, some embodiments of the present disclosure may also include hardware that facilitates the deployment and retraction of perimeter flaps for a thermal barrier. Finally, some examples of a thermal barrier may be segmented into more than one section; e.g. a first thermal barrier and one or more additional thermal barriers. The individual thermal barriers may overlap (e.g. at connecting boundaries) with neighboring thermal barriers and may be secured to each other (e.g. at connecting boundaries) to form a continuous seam to minimize air leakage through the seam and/or to maximize the insulative and thermally reflective aspects of the seam. Thus, multiple thermal barriers and associated hardware may be incorporated into a cab or other compartment, to create a thermal barrier system that optimizes the thermal efficiency of the cab or compartment.

FIG. 1 illustrates an example of a thermal barrier 170 positioned within a compartment 100; e.g. the cab of a long-haul truck. The thermal barrier 170 may divide the interior 140 of the compartment 100 into a first interior space 150 and a second interior space 160. The first interior space 150 may be the space between a window 110 and the thermal barrier 170. In a hot environment, for example on a sunny summer day, solar energy and other external and/or environmental heat sources exterior to the compartment 100 may significantly heat the air in the first interior space 150. Radiant heat transfer may occur from the sun (not shown), which passes directly through the window 110 into the first interior space 150. In addition, conductive heat transfer may also occur through the window 110 into the interior 140 of the compartment 100. Resultant temperature and/or air buoyancy gradients may form in the first interior space 150, resulting in convective heat transfer within the first interior space 150. In this example, an occupant (not shown) may be in the second interior space 160 and may be using an air conditioning system to maintain a cooler interior temperature in the second interior space 160 of the compartment 100. Thus, a thermal barrier 170 as shown in FIG. 1, may significantly minimize heat transfer from the first interior space 150 to the cooler second interior space 160, minimizing the air conditioning system's energy requirement, and subsequently reducing fuel usage and emissions.

Referring again to FIG. 1, this example of a thermal barrier 170 utilizes a core layer 180 sandwiched between a first outer layer 190 and a second outer layer 200. It should be understood that, depending on the specific application and environment, a thermal barrier 170 may include only one outer layer, for example the first outer layer 190 with a core layer 180, or only a second outer layer 200 with a core layer 180, or both a first outer layer 190 and a second outer layer 200 with a core layer 180 positioned in between the two outer layers (190 and 200). In still other cases, a thermal barrier 170 may have only a core layer 180, without any additional outer layers (190 or 200). In addition, it should be understood that other methods exist for connecting and/or joining the components of a thermal barrier 170, for example for joining a first outer layer 190 and/or a second outer layer 200 to a core layer 180. Additional connecting and/or joining methods include the use of adhesives, adhesive layers, heat welding elements to each other, stitching, sewing, and/or quilting.

Referring again to FIG. 1, a thermal barrier 170 may include a first outer layer 190 facing away from a compartment exterior 130, and/or into a compartment's interior 140. For example, a first outer layer 190 may face the second interior space 160 of the interior 140 of the compartment 100. A first outer layer 190 may be loosely associated with the core layer 180. For example a first outer layer 190 may be sewn or otherwise attached to the core layer 180 along a top edge 230c, and/or it may share connecting hardware such that both the first outer layer 190 and the core layer 180 only contact each other due to their close proximity to each other. In other examples, a first outer layer 190 may be physically attached to the core layer 180. For example, a first outer layer 190 may be sewn to the core layer 180 along at least a portion of a core layer's 180 outer periphery. In other cases, a first outer layer 190 may be quilted to a core layer 180. A first outer layer 190 may provide a reflective surface to maximize heat retention in the interior 140 of a compartment 100, to minimize heat losses from the interior 140 of the compartment 100 to the exterior 130. This may be especially desirable in cold environments, for example during the winter when a compartment 100 may be heated by a heating system (not shown). Minimizing heat losses from a second interior space 160 to a first interior space 150 may minimize heat loss from the compartment's interior 140 to the exterior 130, and thus, may reduce the heating system's energy consumption, reduce fuel usage, and minimize polluting emissions to the environment.

Thus, a first outer layer 190 that faces the interior 140 of a compartment 100 may be constructed using a metallized fabric or otherwise reflective material, for example TEMPTROL®, SCOTCHLITE SILVER REFLECTIVE MATERIAL®, CORDURA®, and/or any other suitable reflective material or fabric. In other cases, a first outer layer 190 may include a layer of aluminum applied to a support layer; e.g. fabric and/or plastic. In still other examples, a first outer layer 190 may include a coating that is applied directly to the outside surface of the core layer 180.

Referring again to FIG. 1, a second outer layer 200 may be positioned to face the window 110 and the exterior 130 of the compartment 100 (e.g. the outside environment). A second outer layer 200 may be loosely associated with the core layer 180. For example, a second outer layer 200 may share the same mounting hardware used to mount a core layer 180 to the wall 120 of a compartment 100, such that the second outer layer 200 and the core layer 180 may be in contact because of their close proximity to each other and spatial orientation. In other cases, a second outer layer 200 may be sewn or otherwise connected to the core layer 180 along a top edge 230a and/or share connecting hardware such that both the second outer layer 200 and the core layer 180 hang downward and contact each other due to their close proximity to each other and spatial orientation. In other examples, a second outer layer 200 may be physically attached to the core layer 180. For example, a second outer layer 200 may be sewn to the core layer 180 along at least a portion of the core layer's outer periphery. In other cases, a second outer layer 200 may be quilted to a core layer 180. Referring again to FIG. 1, each of a core layer 180, a first outer layer 190, and/or a second outer layer 200 may have one or more edges, with examples of edges shown (see 230a, 230b, 230c, 230d, 230e, and 230f).

A second outer layer 200 may provide a reflective surface to minimize heat transfer from the external environment into the compartment's interior 140; e.g. radiant heat from the sun in particular. Thus, a second outer layer 200 that faces the outside environment may be constructed using a metallized fabric or otherwise reflective material, for example TEMPTROL®, SCOTCHLITE SILVER REFLECTIVE MATERIAL®, CORDURA®, and/or any other suitable reflective material or fabric. In other cases, a second outer layer 200 may include a layer of aluminum applied to a support layer; e.g. fabric and/or plastic. In still other examples, a second outer layer 200 may include a reflective coating that is applied directly to the outside surface of the core layer 180.

An outer layer (190 and/or 200) may complement the insulating properties of a core layer 180, especially in applications where in interior 140 of the compartment is to be kept cool, by minimizing radiant heat transfer into the compartment 100 from the exterior 130. Thus, an outer layer (190 and/or 200) may be selected with a high reflectivity (e.g. low absorbance) for energy in the ultra-violet, visible, near-infrared and/or infrared wavelengths of the solar radiation spectrum. In some embodiments of the present disclosure, for example in cold climates, an outer layer (190 and/or 200) may be selected with a low reflectivity (e.g. high absorbance) for energy in the ultra-violet, visible, near-infrared and/or infrared wavelengths of the solar radiation spectrum. For example, an outer layer facing the external environment of the cab of a long-haul truck (e.g. the sun) may be configured to absorb the sun's energy to facilitate the transfer of heat from the external environment into the cab. In addition, again potentially for cold climates, an outer layer facing the interior environment of the cab (e.g. the sleeper compartment) may be configured to have a high reflectivity to help maintain thermal energy in the cab's interior 140.

As described above, a thermal barrier 170 may include a core layer 180 positioned between at least two outer layers (190 and 200). In the example shown in FIG. 1, the first outer layer 190 faces away from the outside environment (e.g. faces towards the inside of a truck's cab), and the second outer layer 200 faces the window 110 and the outside environment. The core layer 180 may be constructed of an insulating material to reduce conductive heat transfer between the first interior space 150 and the second interior space 160. The core layer 180 may be constructed of a rigid material and/or a flexible material (e.g. fabric). Examples of materials that may be used to construct the core layer 180 of a thermal barrier 170 include hydrocarbon based materials such as polyurethane, polypropylene, polyethylene, polyisocyanurate, polystyrene, in addition to cellulose, mineral wool, fiberglass, other naturally occurring insulating fibers, and/or any other suitable insulating materials. The core layer 180 may be provided in the form of a rigid panel, a flexible foam panel, a flexible batt, a flexible blanket, and/or any other form suitable for a specific application and/or environment. A core layer 180 may provide insulating characteristics to the thermal barrier 170, characterized by R-values between about 2 hr ft$^{2\circ}$ F./Btu per inch and about 50 hr ft$^{2\circ}$ F./Btu per inch. A core layer 180 for a thermal barrier 170 may be provided at any thickness desired and will be largely determined by the specific application and environment (e.g. hot summer conditions, cold winter conditions, etc.). For example, a core layer 180 may have a thickness between about 1 mm and about 50 mm. In some embodiment of the present disclosure, a core layer 180 may be constructed using an automotive acoustic and/or thermal insulation, for example THINSULATE®.

FIG. 1 also shows that a thermal barrier 170 may include at least one flap 210, in this case positioned substantially within a gap 205 between a top edge of the thermal barrier 170 and a wall 120; e.g. a ceiling. In this example, such a flap 210 may be secured to at least one core layer 180, first outer layer 190, and/or second outer layer 200 along at least one edge (see 230a, 230b, and 230c) of the at least one core layer 180, first outer layer 190, and/or second outer layer 200. Other examples of thermal barriers 170 may include one or more flaps 210 positioned around one or more edges of a thermal barrier 170, for example along at least one of a top edge (see 230a, 230b, and 230c), a bottom edge (see 230d, 230e, and 230f), and/or a side edge (not shown). A flap 210 may be oriented vertically, horizontally, or in any other suitable orientation relative to the inside surfaces and walls of a compartment. As described above, a purpose for a flap 210 is to at least provide a physical barrier to air flow between the interior spaces (150 and 160) that are separated by the thermal barrier 170, in order to minimize convective heat transfer between the interior spaces (150 and 160). For example, for a hot weather application, a flap 210 may minimize convective heat transfer from a hot first interior space 150 to a cooler (e.g. air conditioned) second interior space 160. Alternatively, for a cold weather application, a flap 210 may minimize heat losses from a heated second interior space 160 (e.g. the driver and/or sleeper compartments) to the external environment (e.g. exterior 130) due to convective heat losses from the second interior space 160 to a colder first interior space 150.

Thus, a flap 210 may include any physical barrier configured to physically block air flow through a gap 205 located and/or positioned between an edge (e.g. 230a, 230b, 230c, 230d, 230e, and 230f) of a thermal barrier 170 and a neighboring surface or wall 120. In other words, a flap 210 may be any physical barrier configured to physically block the transfer of air and/or heat from at least a first interior space 150 to a second interior space 160, where the spaces are separated by a thermal barrier 170. Examples include fabric and/or other material physically attached (e.g. to one or more edges (see 230a, 230b, 230c, 230d, 230e, and 230f) to the thermal barrier 170, and positioned substantially within a gap 205 between an outer edge (see 230a, 230b, 230c, 230d, 230e, and 230f) of the thermal barrier 170 and a surface or wall 120. A flap 210 may be attached to a thermal barrier 170 by various methods, for example, by sewing, stapling, buttoning, gluing, adhering, and/or any other suitable technique. A flap 210 that is attached to a thermal barrier 170 may include a swatch of fabric or material with a length approximately equal to the corresponding dimension of the thermal barrier 170, and a height at least equal to the dimension of the gap 205 (e.g. distance from the relevant outer edge of the thermal barrier 170 to the inside surface of the relevant wall 120). Thus, a flap 210 may be a swatch of fabric, or other material, in a rectangular shape, square shape, triangular shape, and/or any other shape configured to fill the shape, size, and dimensions of a gap 205.

In other cases, a flap 210 may be an extension of at least one element of the thermal barrier 170; e.g. an extension of a first outer layer 190, an extension of a second outer layer 200, and/or an extension of a core layer 180. In such a case, an extension (e.g. the flap 210) of the thermal barrier element may extend across the gap 205 to physically touch the corresponding wall 120 to create a barrier to air flow from a first interior space 150 to a second interior space 160.

A flap 210 is intended to provide at least a physical barrier to air flow. Thus, a flap 210 may be configured to be in physical contact with the inside surface of its neighboring wall 120 in such a way that open spaces between the thermal barrier 170 and the corresponding wall 120 are eliminated or minimized. In some cases, a flap 210 may be constructed from a material that is sufficiently elastic and/or flexible that the flap 210 may conform to the shape of the inside surface of a wall 120 (e.g. wall, ceiling, and/or floor). For example, a flap 210 may be constructed with an elastic (e.g. polymer) component to enable the shape of the flap 210 to conform to the shape of the wall 120, resulting in a more complete seal between the first interior space 150 and the second interior space 160. Referring again to FIG. 1, a flap 210 may include a panel of rubberized and/or elastic material with a first end connected to the second outer layer 200 of the thermal barrier 170, and a length of rubberized material that folds on itself and terminates with a second end attached to the first outer layer 190 of the thermal barrier 170.

Therefore, a flap 210 may be constructed from and/or include one or more elastic materials including rubber, polyisoprene, polybutadiene, Neoprene, butyl rubber, styrene-butadiene, silicone rubber, ethylene propylene diene rubber (EPDM), nitrile rubber and/or any other suitable elastomeric material. In other examples, a flap 210 may be constructed from and/or include a metallized fabric or otherwise reflective fabric, for example TEMPTROL®, SCOTCHLITE SILVER REFLECTIVE MATERIAL®, CORDURA®, and/or any other suitable reflective material or fabric. In still other examples, a flap 210 may be constructed from and/or include polyurethane, polyisocyanurate, polystyrene, cellulose, mineral wool, fiberglass, other naturally occurring insulating fibers, and/or any other suitable insulating materials. In other examples, a flap 210 may be constructed from and/or include an automotive acoustic and/or thermal insulation, for example THINSULATE®.

In some cases, it may be desirable to reversibly move a thermal barrier between two or more positions; e.g. a closed position where the thermal barrier separates an interior compartment into first space separated from a second space, and an open position where the thermal barrier does not separate the interior compartment into more than one space. A moveable thermal barrier may be achieved by constructing the thermal barrier with flexible materials such as fabric; e.g. in the form of a curtain. A "curtain construction" may allow a thermal barrier to fold and/or collapse onto itself, enabling the thermal barrier to be pushed to one side of a compartment (open position), and then pulled and re-extended into a closed position, when separating the compartment is desired. A moveable and/or positionable thermal barrier may also be achieved using rigid, non-flexible components. For example, a thermal barrier may be constructed using multiple, interlocking, rigid panels that fold in on each other, like an accordion. In other examples a thermal barrier may be constructed using multiple rigid panels that reversibly telescope into each other, or reversibly slide against one another.

Figure 2:
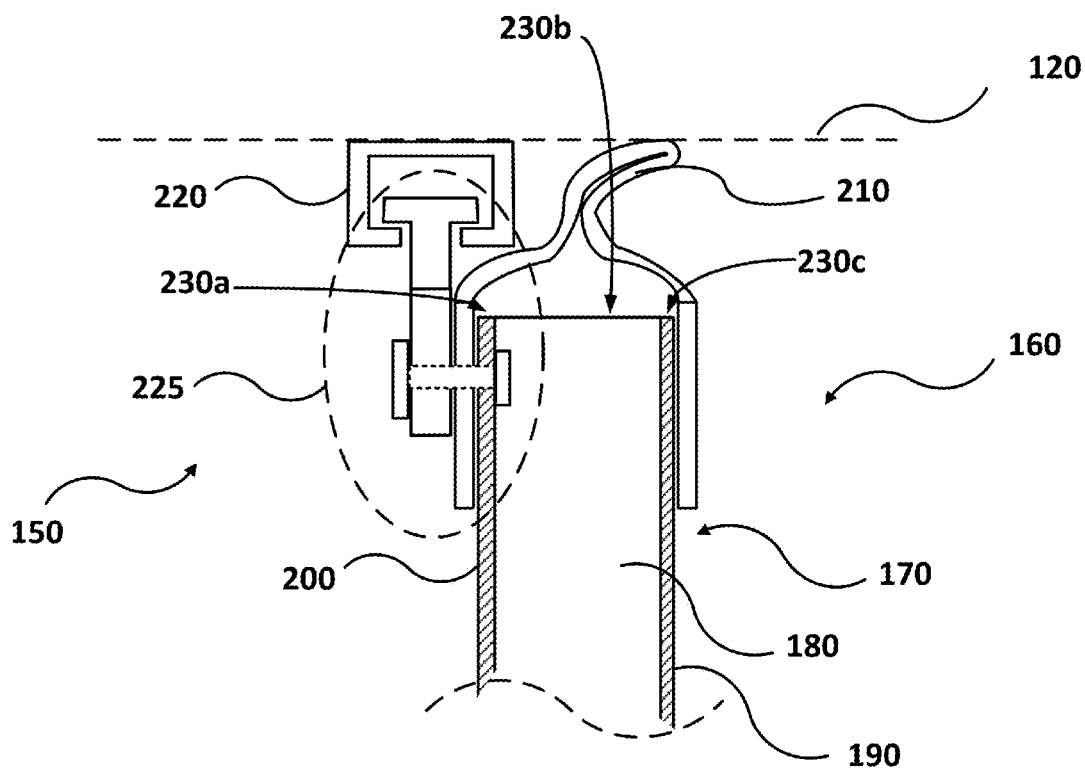
FIG. 2 illustrates a thermal barrier, according to some embodiments of the present disclosure.
Figure 2:
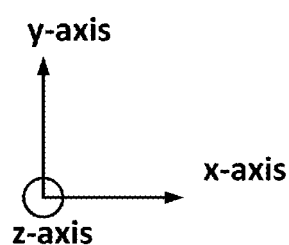
Figure 3:
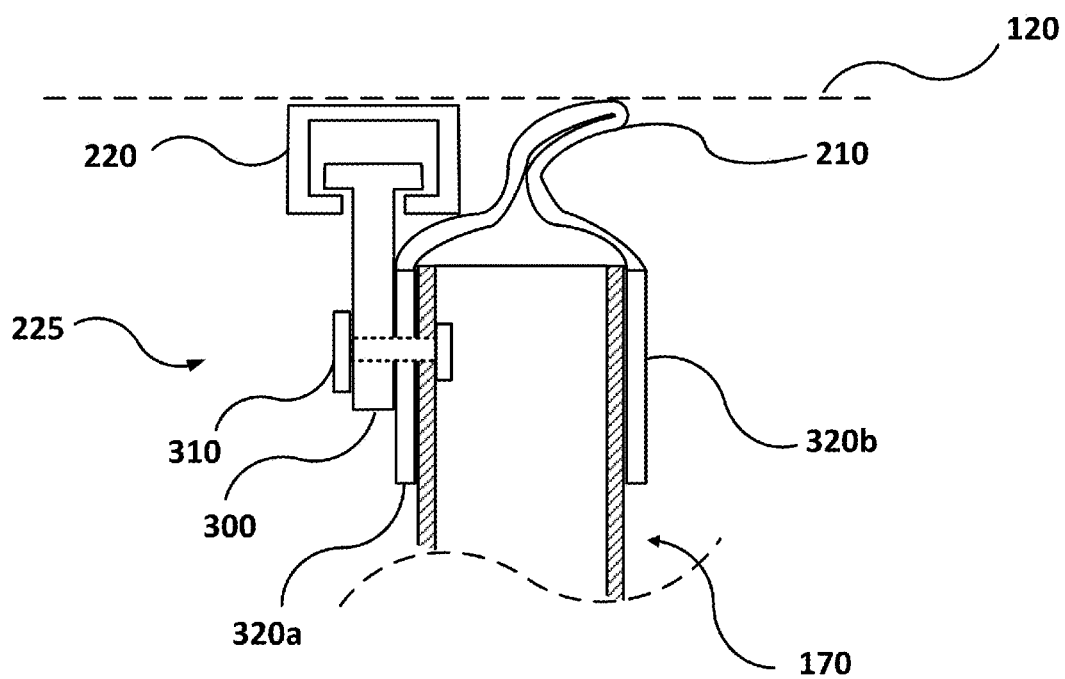
FIG. 3 illustrates mounting hardware for installation of a thermal barrier within a compartment, according to some embodiments of the present disclosure.

A movable thermal barrier system may also have various components to enable movement of the thermal barrier. FIGS. 2 and 3 illustrate embodiments of how a thermal barrier 170 may be physically mounted to a wall 120 (e.g. a ceiling) in such a way that the thermal barrier may be reversibly moved between various positions (e.g. opened and closed). In these examples, the thermal barrier 170 may be connected to the wall 120 of the compartment (e.g. the cab of a truck) using a mounting track 220 attached to the wall, and mounting hardware 225 attaching the thermal barrier 170 to the mounting track 220. As shown in FIGS. 2 and 3, a mounting track 220 may include a slot and/or groove positioned along the wall 120, thus marking a boundary intended to be occupied by the thermal barrier 170 for separating the compartment into two spaces. The mounting hardware 225 may also include a slide 300 with a first end configured to be placed within the mounting track 220 and a second end secured to the thermal barrier 170. A slide 300 may be physically attached to a thermal barrier 170 by a connector 310, such as a pin, screw, rivet, staple, and/or any other suitable connector. FIG. 3 also illustrates that attachment of a thermal barrier 170 to a compartment wall 120 may also include the use of a first tab 320a and/or a second tab 320b extending from the flap 210. The first tab 320a and the second tab 320b may be separate elements or extensions of the flap 210 itself. Tabs (e.g. 320a and 320b) may, for example, be constructed of more durable materials to prevent the thermal barrier from tearing under its own weight and/or due to day-to-day use of the thermal barrier 170 (e.g. repeated opening and closing). For example, a first tab 320a and/or a second tab 320b may be constructed of a more durable fabric, polymer, and/or metal material than the materials used for the thermal barrier 170 or the flap 210. Thus, a tab may have a length approximately equal to the length of the thermal barrier and a width that is sufficient to encompass the connector 310 passing through the tab and sufficient to provide the structural integrity needed to prevent tearing of the tab and/or the thermal barrier 170. In other cases, for example when one or more connectors 310 are in the form of screws, rivets, and/or similar cylindrically shaped connectors, a tab (e.g. 320a and 320b) may be in the form of a circular washer that encompasses the diameter of an individual connector 310. Thus, in some examples each connector 310 may be paired with at least one tab (e.g. circular washer). In other examples, a connector 310 may pass completely through the first tab 320a, all of the elements of the thermal barrier 170 (e.g. first outer layer, second outer layer, and core), and the second tab 320b.

EXAMPLES

Figure 4:
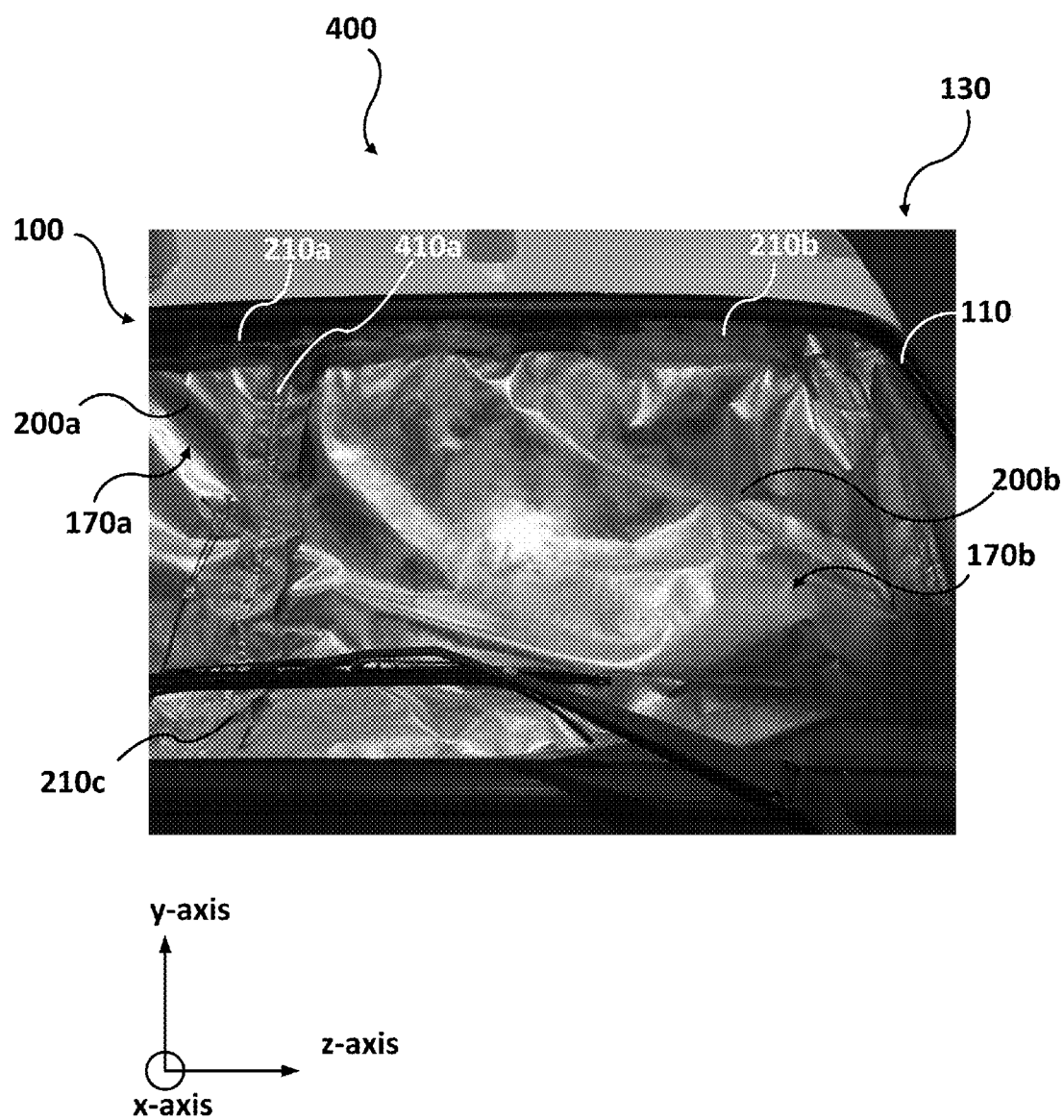
FIG. 4 illustrates two thermal barriers installed in a truck cab behind the front windshield, according to some embodiments of the present disclosure.

The following examples illustrate some of the features described above. FIG. 4 illustrates two thermal barriers of a thermal barrier system 400 having multiple thermal barriers working together to minimize heat transfer between a compartment and the compartment's external environment and/or to minimize heat transfer between interior spaces within the compartment. Specifically, FIG. 4 provides an outside view of a front window 110 (windshield) of a cab (compartment 100) of a long-haul truck. A first thermal barrier 170a and a second thermal barrier 170b are positioned within the compartment 100, in close proximity to the window 110. The closeness of the two thermal barriers (170a and 170b) to the window 110 divides the interior space of the compartment 100 into a first, smaller interior space between the window and the thermal barriers (170a and 170b), and a second, larger interior space behind the thermal barriers inside the compartment; e.g. the driver's area and/or sleeping compartment. (This second interior space is not visible in FIG. 4.) FIG. 4 shows the first thermal barrier 170a and the second thermal barrier 170b physically joined at a connecting boundary 410a, resulting in a single thermal barrier system 400 substantially covering the entire surface area of the window 110. The connecting boundary 410a may physically join the first thermal barrier 170a to the second thermal barrier 170b using various connecting methods; e.g. zipper, buttons, VELCRO®, magnets, snaps, clasps, etc. FIG. 4 also illustrates examples of flaps for minimizing air flow between the compartment's interior spaces. In this example, a first flap 210a and a second flap 210b are positioned horizontally along the top edge of the first thermal barrier 170a and the second thermal barrier 170b, respectively. These flaps (210a and 210b) minimize the convective flow of hot air created by radiant heat transfer through the window 110 to the cooler interior space of the compartment 100 of the occupants (e.g. an air-conditioned sleeper compartment). A third flap 210c is also provided, positioned along the connecting boundary 410a. This third flap 210c may help to provide a better seal between the first thermal barrier 170a and the second thermal barrier 170b, thus eliminating both convective heat transfer due to the flow of air, as well as radiant heat transfer into the compartment's interior.

The example shown in FIG. 4, also illustrates an embodiment for the outside layers of a thermal barrier. The first thermal barrier 170a and the second thermal barrier 170b each include a second outer layer 200a and 200b, respectively, both of which are fabricated using a metallized fabric, in this case TEMPTROL®. Thus, at least one outer layer (200a and/or 200b) may minimize radiant heat transfer into the interior of the compartment 100 by reflecting a significant amount of the sun's radiation away from the compartment 100, back out to the external environment.

FIG. 4 illustrates various folds and creases on the outside surfaces of the thermal barriers (170a and 170b). This is because this example of a thermal barrier system 400 is constructed using flexible materials. The TEMPTROL® is constructed from a flexible metallized fabric. In addition each thermal barrier is composed of a flexible, inner, insulating core layer 180 of THINSULATE® (not shown). Also, each thermal barrier shown in FIG. 4 also has a second outer layer constructed of TEMPTROL®, which are not visible since they are facing the inside of the compartment 100. Finally, each of the first flap 210a, the second flap 210b, and the third flap 210c are provided as extensions of the materials making up the second outer layers (200a and 200b) and the first outer layers (not shown) (e.g.) TEMPTROL®. Thus, all of the components used to construct the example thermal barriers (170a and 170b) shown in FIG. 4 are made from flexible materials, which enable the thermal barriers (170a and 170b) to be pushed aside to an open position, and then pulled back to a closed position. FIG. 4 also illustrates an example for connecting the various elements of the thermal barriers (170a and 170b), namely the second outer layers (200a and 200b) to their corresponding cores and outer layers (not shown). In this example, the elements of the thermal barriers (170a and 170b) are sewn together along the peripheral edges of the thermal barriers (170a and 170b).

Figure 5:
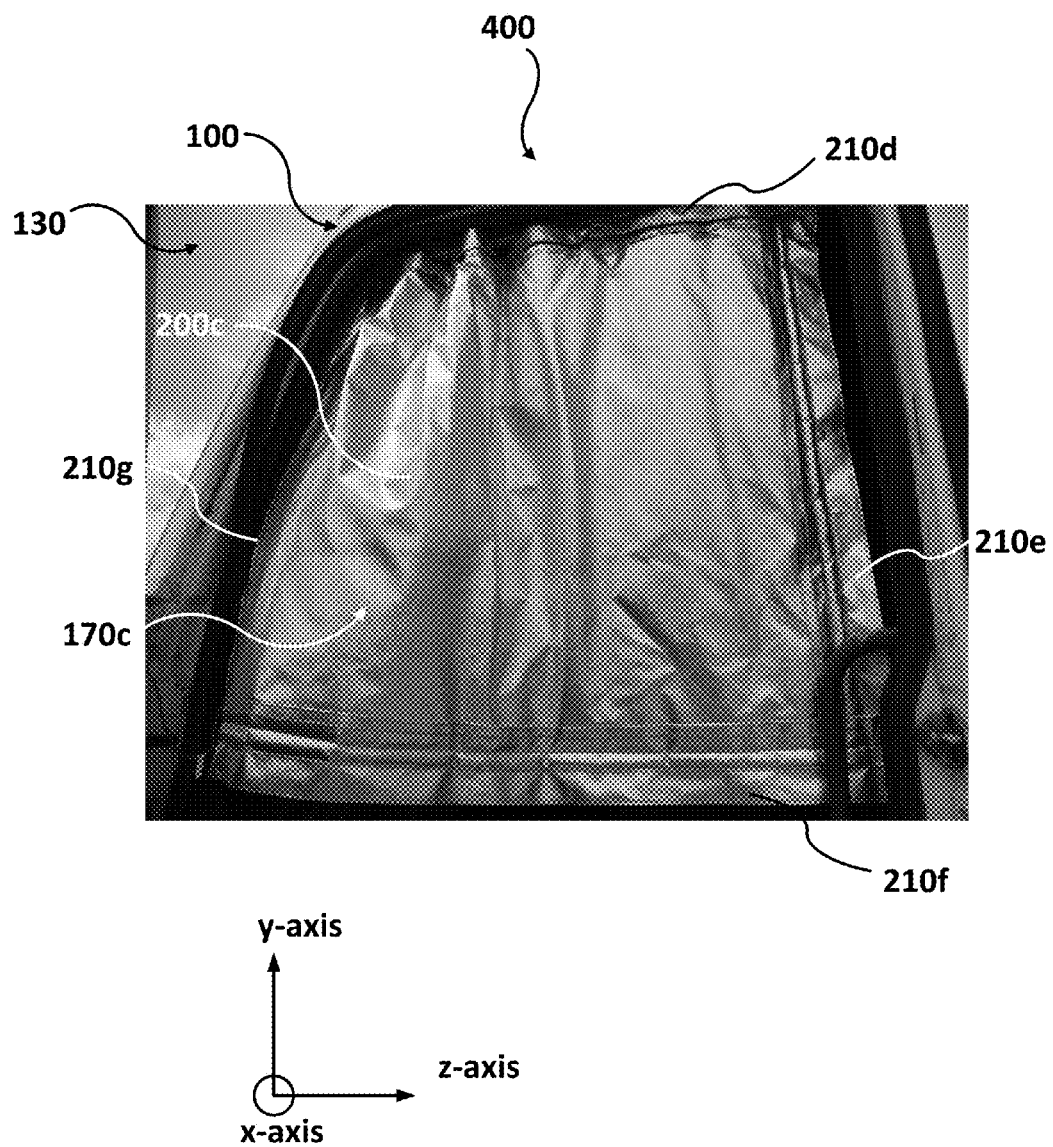
FIG. 5 illustrates a thermal barrier installed in a truck cab to cover the driver-side doorway, according to some embodiments of the present disclosure.

FIG. 5 illustrates another element of the thermal barrier system 400 shown in FIG. 4, a third thermal barrier 170c positioned in the driver entrance to the truck's compartment 100 (e.g. cab). This third thermal barrier 170c has many of the same features of the two thermal barriers (170a and 170b) illustrated in FIG. 4. The third thermal barrier 170c also has a second outer layer 200c (with the first outer layer not visible), or outward facing layer and is constructed of flexible elements that enable the third thermal barrier 170c to be easily moved from the illustrated closed position, to an open position (not shown). The second outer layer 200c and the first outer layer (not shown) of the third thermal barrier 170c are also constructed of TEMPTROL®, with an inner core layer (not shown) constructed of THINSULATE®. The third thermal barrier's 170c flexibility is noticeable in FIG. 5 by the pleats present in the upper left corner of third thermal barrier 170c, and the folds running vertically down the center of the thermal barrier 170c.

FIG. 5 also illustrates the third thermal barrier 170c shaped to the form of a driver side window; e.g. substantially square in shape. Each of the four edges of the third thermal barrier 170c has a flap (see 210d, 210e, 210f, and 210g). Like the flaps (see 210a, 210b, and 210c) for the first and second thermal barriers (170a and 170b) positioned in the window 110, these four flaps (see 210d, 210e, 210f, and 210g) provide physical barriers to airflow from a first interior space created between the passenger window (not shown) and the third thermal barrier 170c itself, and a second interior space (not shown; e.g. the driving area or sleeper area) within the compartment 100. The four flaps (see 210d, 210e, 210f, and 210g) shown in FIG. 5 are all configured as extensions of the third thermal barrier 170c and push up against the interior surfaces of the compartment 100, and conform to these surfaces to effectively create barriers to convective air flow.

Figure 6:
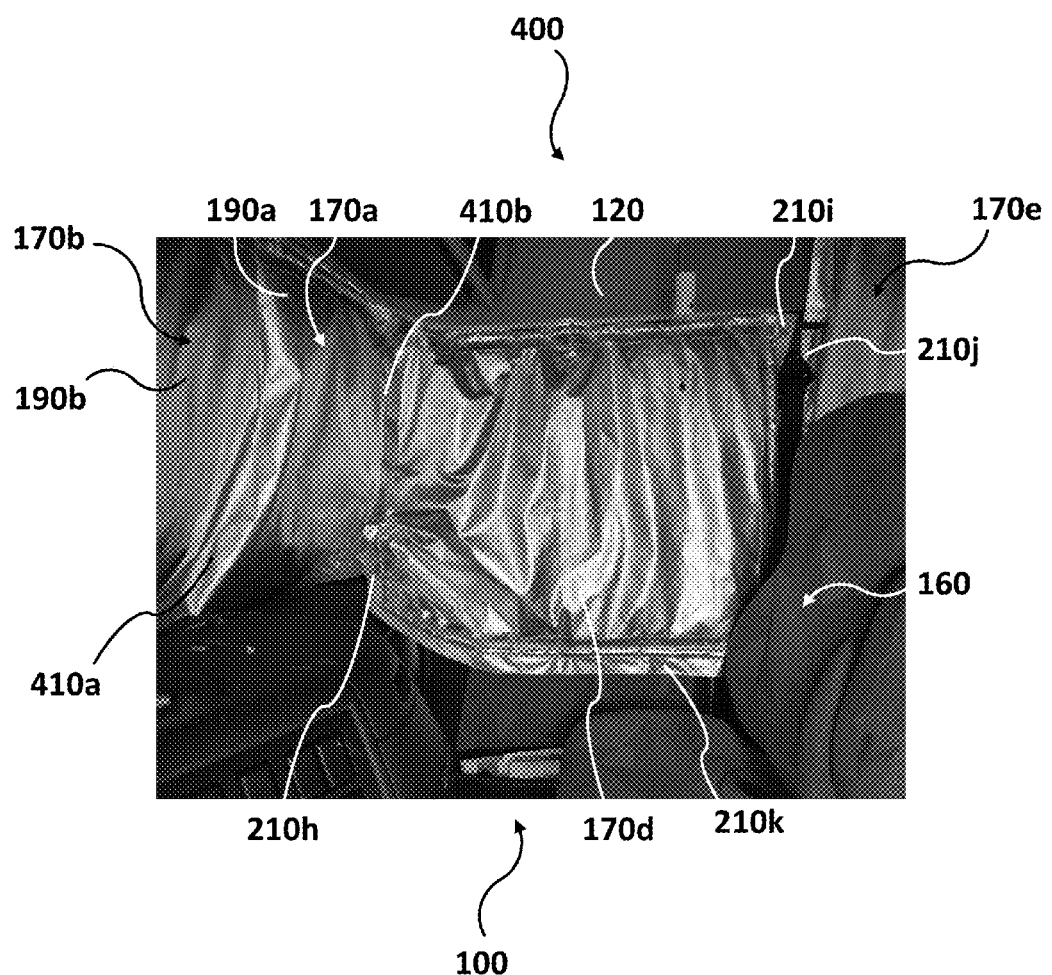
FIG. 6 illustrates multiple thermal barriers installed in the interior of a cab of a long-haul truck, according to some embodiments of the present disclosure.

FIG. 6 illustrates a view into the interior of the same compartment 100 illustrated in FIGS. 4 and 5, through the driver-side doorway (not shown). Thus, FIG. 6 illustrates first outer layers (190a and 190b) corresponding to the two connecting thermal barriers (170a and 170b) placed in the cab's windshield, as shown in FIG. 4. The connecting boundary 410a between the first thermal barrier 170a and the second thermal barrier 170b is visible as a vertical line in the top half of the thermal barriers, bending to the left in the lower half. The first outer layers (190a and 190b) of the first and second thermal barriers (170a and 170b), respectively, are both constructed of metallized fabric (TEMPTROL®).

FIG. 6 illustrates additional elements of the example of a thermal barrier system 400 previously shown in FIGS. 4 and 5 and described above. For example, FIG. 6 also illustrates the inside surfaces of a fourth thermal barrier 170d, positioned against the passenger-side window (not shown) of the compartment 100, and a fifth thermal barrier 170e positioned between the second interior space 160 (e.g. the driving area) and a second interior space (e.g. a sleeper area, not visible in FIG. 6; see FIG. 9). The fourth and fifth thermal barriers (170d and 170e respectively) have the same elements (e.g. outer layers, core layers, flaps, etc.) as the first, second, and third thermal barriers of the thermal barrier system, and are constructed of identical materials (e.g. TEMPTROL® and) THINSULATE®. Thus, FIGS. 5 and 6 illustrate a thermal barrier system 400 having a total of five thermal barriers; two thermal barriers (170a and 170b) covering a cab's front windshield, attachable by a center, vertically positioned connecting boundary 410a, a third thermal barrier 170c covering the driver-side window (not shown), a fourth thermal barrier 170d covering the passenger-side window (not shown), and a fifth thermal barrier 170e separating a second interior space 160 of the compartment 100 (e.g. cab) from a third interior space (not shown). The five thermal barriers (170a-e) of this example of a thermal barrier system 400 function together to isolate the cab's interior from external radiation (e.g. solar, street lights, etc.) and also provide barriers to conductive and convective heat transfer between the cab's interior and exterior, as well as between the separated, individual, interior spaces within the compartment 100. FIG. 6 also illustrates multiple additional flaps (see 210h, 210i, 210j, and 210k) strategically positioned along various edges of the thermal barriers to help minimize heat transfer due to convective heat transfer (e.g. air flow) around the peripheral edges of the thermal barriers. FIG. 6 also illustrates a second connecting boundary 410b between the first thermal barrier 170a and the fourth thermal barrier 170d of the thermal barrier system 400.

Figure 7:
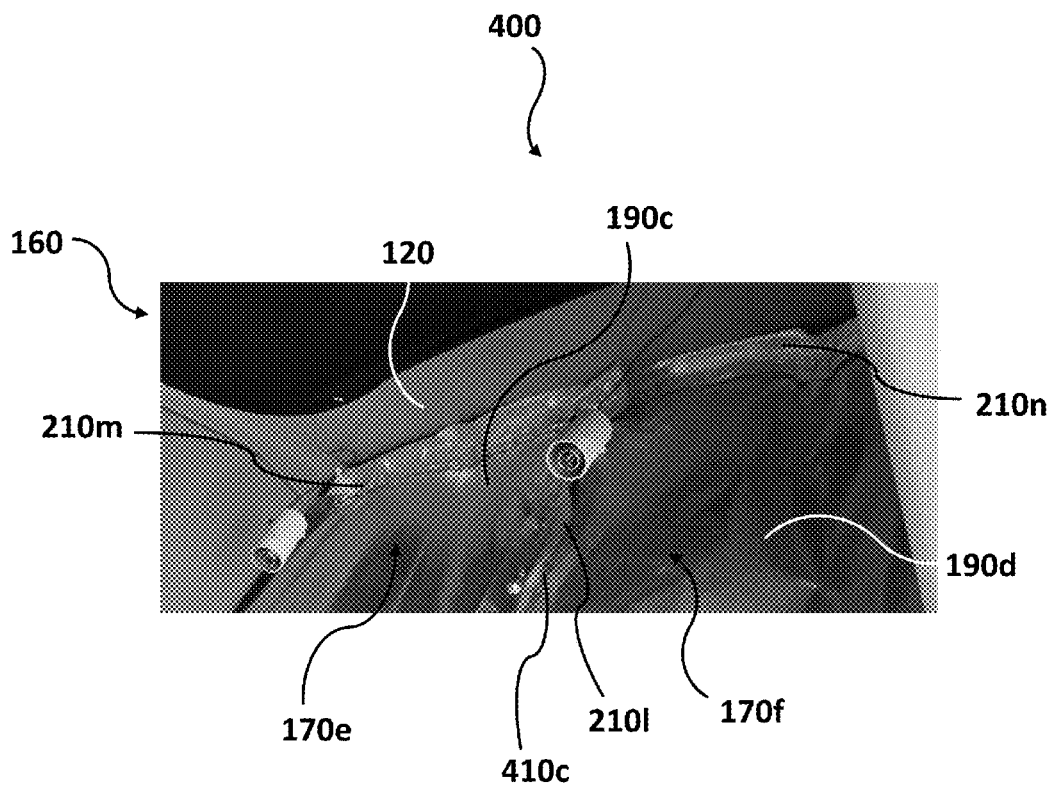
FIG. 7 illustrates two thermal barriers positioned in the interior of a compartment where a connecting boundary between the two thermal barriers is closed, according to some embodiments of the present disclosure. (Top view towards ceiling.)
Figure 9:
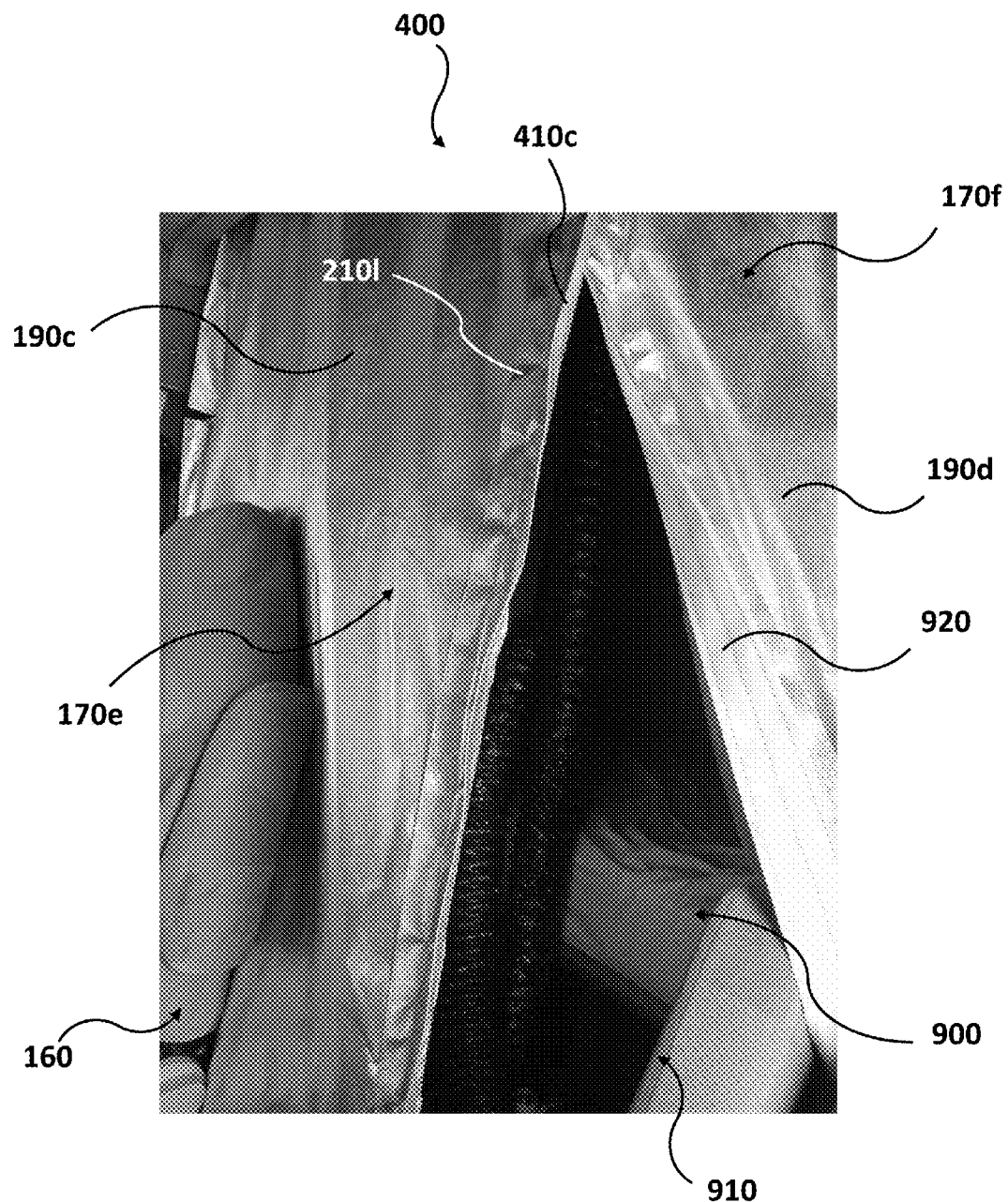
FIG. 9 illustrates two thermal barriers positioned within an interior compartment where a connecting boundary between the two thermal barriers is open, according to some embodiments of the present disclosure.

FIG. 7 illustrates a thermal barrier system 400 that, like the thermal barriers systems 400 illustrated in the windshield of a truck's cab (see FIGS. 4-6), two or more thermal barriers may be positioned within a cab to form, joined by a connecting boundary, a single, larger thermal barrier. In addition, FIGS. 7 and 9 illustrate that a connecting boundary can be constructed to form an entryway through the thermal barriers to allow passage from one interior space to another. Specifically, FIG. 7 illustrates the fifth thermal barrier 170e shown in FIG. 6, physically attached to a sixth thermal barrier 170f at a third connecting boundary 410c. Together, these two thermal barriers physically divide the driving area of the cab (the second interior space 160) from the sleeper area of the cab (a third interior space, not shown). The third connecting boundary 410c, allows easy separation (and reattachment) of the two thermal barriers (170e and 170f) to allow movement by an occupant between the second interior space 160 and the third interior space (not shown). Thus, the third connecting boundary 410c is configure to allow easy transitions between a closed position, as shown in FIG. 7, to an open position as shown in FIG. 9. FIG. 7 further illustrates that each thermal barrier (170e and 170f) has a corresponding first outer layer (190c and 190d respectively), as well as a number of additional flaps (see 210l, 210m, and 210n).

FIG. 9 shows the connecting boundary 410c in an open position of a thermal barrier system 400, where the sixth thermal barrier 170f has been separated, or pulled away, from the fifth thermal barrier 170e. The connecting boundary 410c, which in this example connects the two thermal barriers using VELCRO®, splits apart resulting in an opening 900 large enough to allow an occupant to comfortably pass from the second interior space 160 (the driving area) to the third interior space 910 (the sleeper) and vice versa. Once the occupant has moved to the space desired, the occupant can then reseal the connecting boundary 410c (reconnect the VELCRO® panels) to re-close the two adjoining thermal barriers. The connecting boundary 410c may physically join the fifth thermal barrier 170e to the sixth thermal barrier 170f using various connecting methods and/ or devices; e.g. zipper, buttons, VELCRO®, magnets, snaps, clasps, etc. FIG. 9 illustrates an embodiment that utilizes VELCRO® as a connector 920. FIGS. 7 and 9 also illustrates examples of flaps (210*l* and 210*o*), which provide physical barriers air flow between the driver area and the sleeper area of the cab. Referring again to FIG. 7, the first flap 210*l* and the second flap 210*o* are separate swatches of metallized reflective fabric sewn to the thermal barriers, 170*e* and 170*f*, respectively. In addition, both the fifth thermal barrier 170*e* and the sixth thermal barrier 170*f* have reflective outer surfaces, 190*c* and 190*d*, respectively, constructed of metallized fabric (TEMPTROL®).

Figure 8:
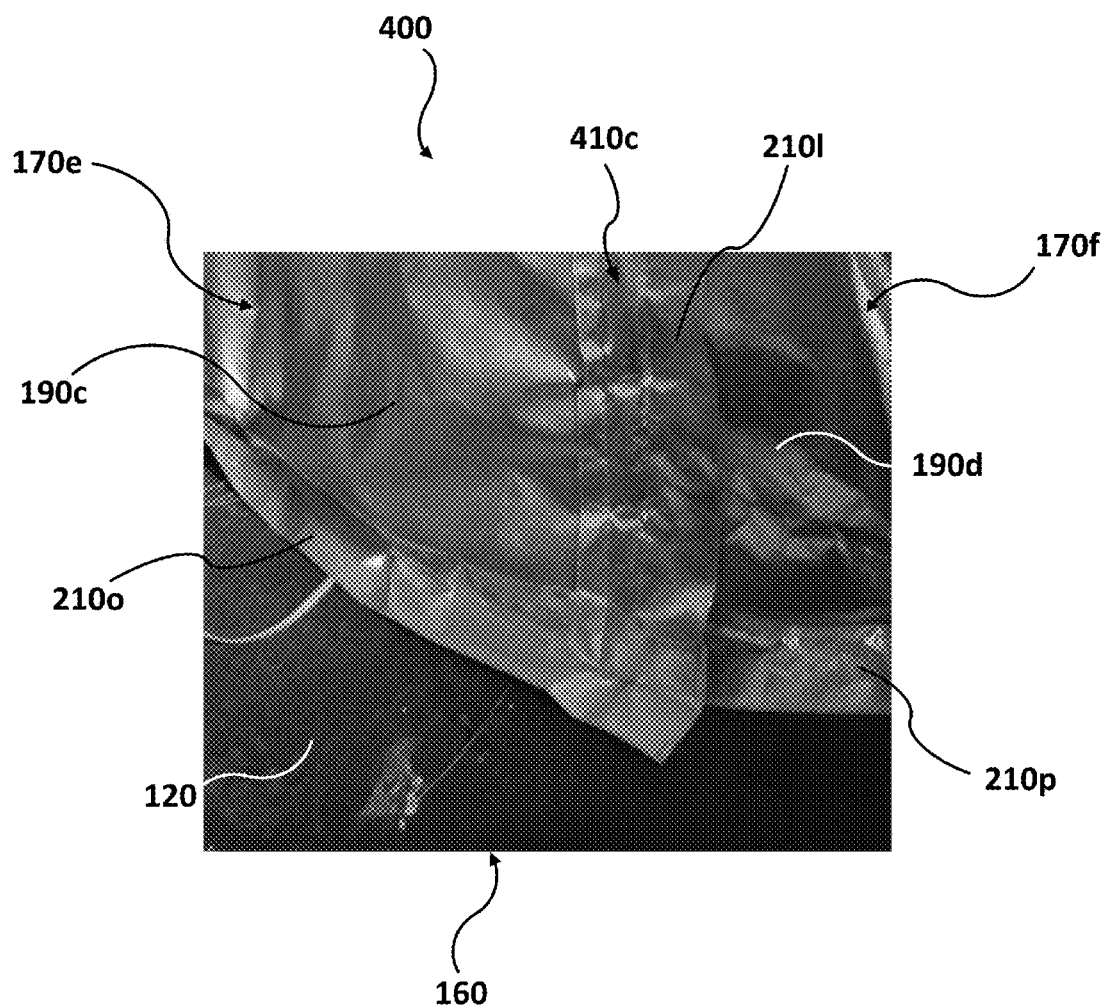
FIG. 8 illustrates two thermal barriers positioned within an interior compartment where a connecting boundary between the two thermal barriers is closed, according to some embodiments of the present disclosure. (Bottom view towards floor.)

FIG. 8 demonstrates further elements of a thermal barrier system 400 with an example of an interface between thermal barriers and a lower surface (e.g. floor). Thus, FIG. 8 focuses on the lower portions of the fifth thermal barrier 170*e* and sixth thermal barrier 170*f* illustrated in both FIGS. 7 and 9. These two barriers form a seal partly due to the weight of the thermal barriers themselves. In addition, the fifth thermal barrier 170*e* and the sixth thermal barrier 170*f* have additional flaps (210*o* and 210*p* respectively), which provide physical barriers to convective heat transfer under the thermal barrier curtains. In this case, the flaps are extensions of the materials used to fabricate the thermal barriers themselves. A boundary between the flaps and the thermal barriers is visible by the seams running parallel to the cab's floor.

Figure 10:
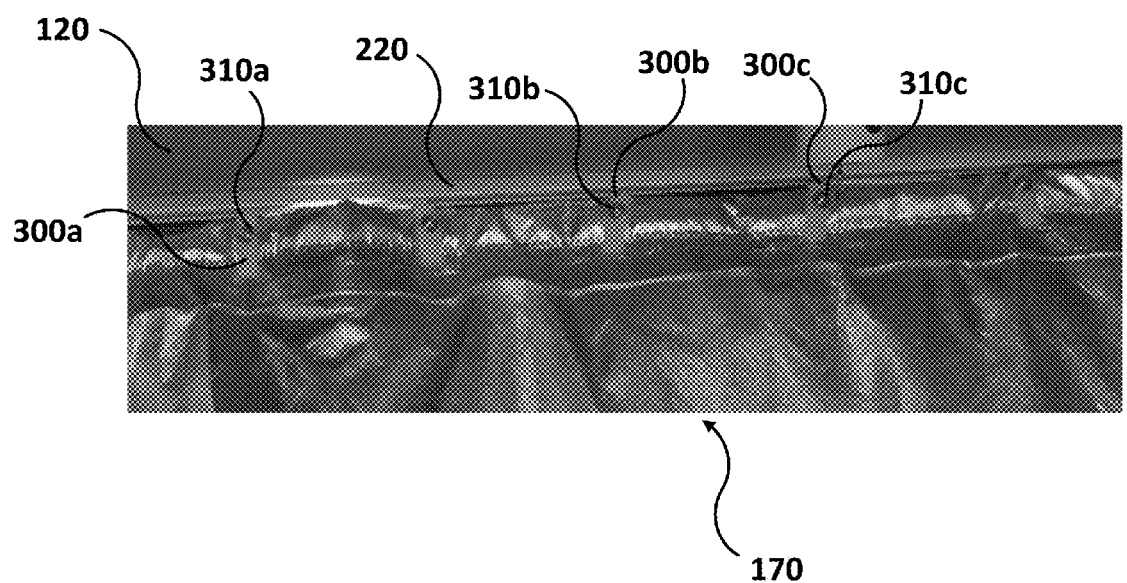
FIG. 10 illustrates a mounting system for attaching thermal barriers to an inside surface of a compartment, according to some embodiments of the present disclosure.

FIG. 10 illustrates an example of a mounting system for securing thermal barriers to the inside surface or surfaces of a compartment; e.g. ceiling and/or walls. A mounting track 220, in the form of a long slot is attached to the wall 120 (e.g. ceiling). This attachment may be achieved by the use of screws, adhesive, and/or any other suitable attaching mechanism. Multiple slides (300*a*, 300*b*, and 300*c*) fit within the mounting track 220. Each slide (300*a*, 300*b*, and 300*c*) has a first end configured to slidably move within the mounting track 220. Each slide (300*a*, 300*b*, and 300*c*) has a second end physically connected to the thermal barrier 170 by a first tab (not shown) and a connector (310*a*, 310*b*, and 310*c*, respectively). In this example, each connector (310*a*, 310*b*, and 310*c*) is a rivet passing at least through its respective first tab and the thermal barrier 170. In addition, each connector (310*a*, 310*b*, and 310*c*) may have a second tab (not shown) on the opposite side of the thermal barrier 170. Thus, an edge of a thermal barrier 170 may be sandwiched between a first tab and a second tab, where a connector (310*a*, 310*b*, and 310*c*) physically penetrates the tabs and the thermal barrier 170, and applies sufficient compressive forces to securely hold the tabs and the thermal barrier 170 together. In addition, in this example, the tabs (not shown) are fabricated from a hard, durable plastic to prevent the connectors (310*a*, 310*b*, and 310*c*) from ripping the thermal barrier 170.

Figure 11:
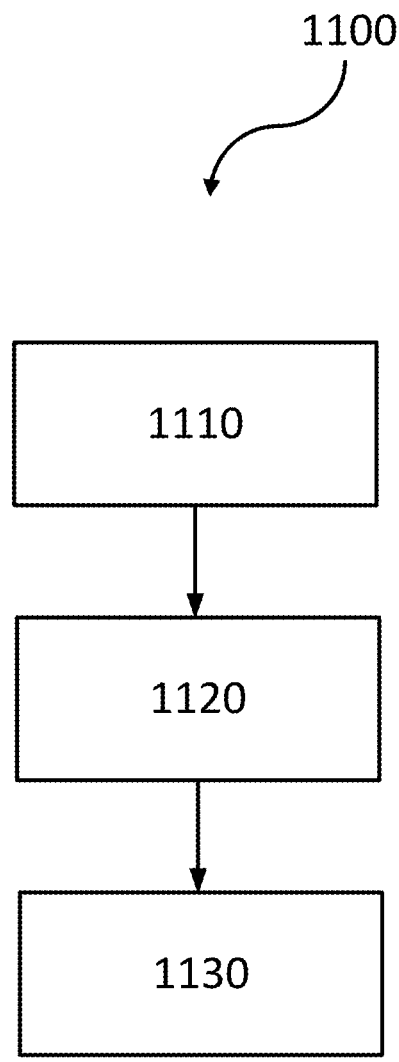
FIG. 11 illustrates a method for reducing heat transfer between a first space and a second space within a compartment (e.g. the cab of a truck), according to some embodiments of the present disclosure.

FIG. 11 illustrates a method 1100 for eliminating and/or minimizing the amount of heat transfer that occurs between a first space (or volume) and a second space, for example, within the cab of a truck or some other vehicle, by the placement of at least one thermal barrier, having at least some of the features as described above, between the first space and the second space. The thermal barrier may accomplish this task by achieving at least one of the following steps, in no particular order: reducing or eliminating conductive heat transfer 1110 through the thermal barrier itself; maximizing the reflection 1120 of electromagnetic energy from at least one surface of the thermal barrier; and reducing or eliminating convective heat transfer 1130 around at least one surface or edge of the thermal barrier. These three steps (1110-1130) may be accomplished be the implementation of one or more of the features of a thermal barrier or thermal barrier system, as described above.

Thus, the thermal barriers, thermal barrier systems, and methods described herein may have different elements and features depending upon the particular climate and environment being designed for. For example, a "hot weather" application (e.g. Florida, Georgia, etc.) may have a thermal barrier designed to keep the external heat out of a cab, while maintaining an interior air conditioned space that is significantly cooler than the external environment. For this case, a thermal barrier may have an outer layer facing the outside environment (e.g. the sun) that is highly reflective, and a core layer that is highly insulating. This design may minimize radiant heat transfer from the outside environment to the thermal barrier, while also minimizing conductive heat transfer through the thermal barrier from the outside to the inside. Alternatively, for a "cold weather" application (e.g. Canada, Scandinavia), a thermal barrier may be designed to keep heat in the cab. In such an embodiment, a thermal barrier may again have a highly insulating core layer. However, an outer layer facing the external environment may be configured to absorb as much radiant heat from the sun as possible.

Some embodiments of thermal barriers and systems as described herein have demonstrated at least a 20% reduction in heat transfer between a truck cab's interior compartment and the external environment relative to existing, stock sleeper curtains and shades (see SAE Int. J. Passeng. Cars— Mech. Sys./Volume 9, Issue 2, 2016, which is incorporated herein by reference in its entirety).

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate aspect, embodiment, or configuration.

What is claimed is:

1. A barrier comprising:
   a core layer comprising a first surface, a second surface, and a first edge; and
   a first outer layer comprising a third surface and a second edge, wherein:
   the third surface substantially contacts the first surface,
   the core layer is configured to minimize conductive heat transfer through the barrier, and
   the first outer layer is configured to maximize reflection of light away from the barrier.

2. The barrier of claim 1, further comprising
   a second outer layer comprising a fourth surface and a third edge, wherein:
   the fourth surface substantially contacts the second surface; and the second outer layer is configured to maximize or minimize the reflection of light away from the barrier.

3. The barrier of claim 2, wherein at least one of the first outer layer or the second outer layer comprises a metalized material.

4. The barrier of claim 2, wherein at least one of the first outer layer or the second outer layer has a reflectivity of up to 95% for light with a wavelength between about 10 nm and about 10,000 nm.

5. The barrier of claim 2, wherein at least one of the first outer layer or the second outer layer is secured to the core layer by at least one of an adhesive, a melted strip, a stitch, a staple, a button, or a zipper.

6. The barrier of claim 1, wherein the core layer has a thickness between about 1 mm and about 50 mm.

7. The barrier of claim 1, wherein the core layer comprises at least one of fiberglass, cellulose, polyurethane, or polystyrene.

8. The barrier of claim 1, wherein the core layer has an R-value between about 2 hr ft$^{2\circ}$ F./Btu per inch and about 50 hr ft$^{2\circ}$ F./Btu per inch.

9. The barrier of claim 2, further comprising:
at least one flap attached to at least one of the core layer, the first outer layer, or the second outer layer, wherein:
the at least one flap is configured to be in contact with an interior surface such that the flap minimizes air flow between the barrier and the interior surface.

10. The barrier of claim 9, wherein:
the at least one flap is attached to at least one of the first edge, the second edge, or the third edge, and
the at least one flap is attached by at least one of an adhesive, a staple, a rivet, a zipper, or a stitch.

11. The barrier of claim 9, wherein the at least one flap comprises at least one of a solid polymeric material, a metalized material, or an insulating material.

12. The barrier of claim 2, wherein:
at least one of the first edge, the second edge, or the third edge extends beyond a boundary defined by a neighboring edge to form at least one flap, and
the at least one flap is configured to be in contact with an internal surface such that the at least one flap minimizes air flow between the barrier and the internal surface.

13. The barrier of claim 12, wherein the boundary comprises a seam used to stitch together at least one of the first outside layer, the second outside layer, or the core layer.

14. The barrier of claim 1, wherein the barrier is divided into a first part and a second part by a connector configured to be reversibly fastened and unfastened.

15. The barrier of claim 14, wherein the connector comprises at least one of a button, a magnet, or a zipper.

16. The barrier of claim 2, wherein the first outer layer and the second outer layer are configured from a single piece of a material.

17. A system comprising:
an interior surface; and
a barrier comprising:
a core layer comprising a first surface, a second surface, and a first edge;
a first outer layer comprising a third surface and a second edge; and
at least one flap attached to at least one of the first edge or the second edge, wherein:
the third surface is secured to the first surface,
the core layer is configured to minimize conductive heat transfer through the barrier,
the first outer layer is configured to maximize reflection of light away from the barrier,
the at least one flap is configured to be in contact with the interior surface such that the flap minimizes convective air flow between the barrier and interior surface, and
the core, the first outer layer, and the at least one flap are substantially flexible.

18. The system of claim 17, wherein the barrier further comprises:
a second outer layer comprising a fourth surface, wherein:
the fourth surface is secured to the second surface; and
the second outer layer is configured to maximize the reflection of light away from the barrier.

19. A method comprising:
dividing a first space from a second space with a thermal barrier, wherein:
the dividing comprises:
reducing or eliminating conductive heat transfer through the thermal barrier;
maximizing or minimizing the reflection of electromagnetic energy from at least one external surface of the thermal barrier; and
reducing or eliminating convective heat transfer around at least one surface or edge of the thermal barrier between the first space and the second space, wherein:
the thermal barrier minimizes the transfer of heat between the first space and the second space.

20. The method of claim 19, wherein the dividing is performed in a cab of a vehicle.

* * * * *